United States Patent
Bessho et al.

[11] Patent Number: 5,209,582
[45] Date of Patent: May 11, 1993

[54] THERMAL PRINTER

[75] Inventors: Kazuya Bessho; Takayasu Hongo; Kenichi Fujii, all of Hyogo, Japan

[73] Assignee: Kanzaki Paper Manufacturing Co., Ltd., Tokyo, Japan

[21] Appl. No.: 826,592

[22] Filed: Jan. 28, 1992

[30] Foreign Application Priority Data

Jan. 29, 1991 [JP] Japan .................................. 3-102136

[51] Int. Cl.$^5$ ...................... B41B 27/26; G01N 21/86
[52] U.S. Cl. ................................. 400/50; 400/120; 400/708; 250/560; 250/561
[58] Field of Search ............ 400/50, 120, 708, 708.1; 250/560, 561; 346/76 PH

[56] References Cited

U.S. PATENT DOCUMENTS

| | | | |
|---|---|---|---|
| 4,265,556 | 5/1981 | Krieg et al. | 400/708 |
| 4,738,553 | 4/1988 | Uemura et al. | 400/120 |
| 4,795,999 | 1/1989 | Takahashi et al. | 400/120 |
| 4,978,973 | 12/1990 | Ogushi et al. | 400/120 |
| 5,087,925 | 2/1992 | No et al. | 346/76 PH |

FOREIGN PATENT DOCUMENTS

| | | | |
|---|---|---|---|
| 3628528 | 3/1987 | Fed. Rep. of Germany | 400/708 |
| 0137180 | 8/1982 | Japan | 400/708.1 |
| 0190882 | 10/1984 | Japan | 400/708 |
| 61-64480 | 4/1986 | Japan . | |
| 0193876 | 8/1986 | Japan | 400/708 |
| 0105847 | 5/1987 | Japan | 400/708 |
| 0134283 | 6/1987 | Japan | 400/708 |

*Primary Examiner*—Eugene H. Eickholt
*Attorney, Agent, or Firm*—Cushman, Darby & Cushman

[57] ABSTRACT

A thermal printer uses a thermal line head which, when paper having a width smaller than a predetermined width is supplied in error, is able to inhibit electric supply to the heat generating devices that are situated outside of the paper to thereby prevent the heat generating devices from shortening their life span due to the idle heating thereof. There is provided a device which can be moved in the width, or lateral, direction of paper to detect the side edges of the paper and, in accordance with the moving distance of the paper side edge detection units from the reference position thereof, it is possible to specify the block of the thermal line head to which electric supply is to be inhibited.

5 Claims, 2 Drawing Sheets

THERMAL PRINTER

BACKGROUND OF THE INVENTION

The present invention relates to a thermal printer including a device for inhibiting heat generation of heating elements existing outside of a width of paper which is supplied.

When printing is achieved by use of a thermal printer including a line head, the contents to be printed (that is, printing data) are developed as a pattern in a given paper width, and in the thermal head heat generating devices existing in a range corresponding to the paper width are selectively heated. However, for printing information developed in a certain paper width, paper having a width narrower than the certain paper width may be supplied in error to the printer. In such case, there is a possibility that even heating elements in a range where the paper is not present actually may be heated. If the heating elements are heated in the absence of paper, then a platen roller disposed opposingly to the heating elements is thermally damaged thereby shortening its life. Also, in the heating elements, when compared with a case in which paper is passing before them, heat is easier to accumulate, thereby resulting in the shortened life of the heating elements.

In a conventional thermal printer, there is employed a structure which does not carry out printing operation when it finds that no paper is supplied. But, the conventional thermal printer does not include a structure which, when the width of the paper is short, can inhibit heat generation of the heating elements of a thermal head that exist outside of the paper width.

SUMMARY OF THE INVENTION

It is an object of the invention to provide means for inhibiting heat generation of heat generating devices existing outside of the width of paper supplied to thereby prevent a platen roller or a thermal head of a thermal printer from shortening its life due to the idle heating of the heat generating devices.

In order to achieve the above object, according to the invention, there is provided a thermal printer which comprises paper edge detecting means for moving in a width, or lateral, direction of a piece of paper to detect side edges of said paper, detecting means for detecting a moving distance of said paper edge detecting means from the reference position thereof to an edge position of said paper side edge, and control means for inhibiting power supply to a thermal head existing outside of said side edge of said paper. Power is supplied to said thermal head in accordance with a signal generated from said detecting means corresponding to said moving distance of said paper edge detecting means.

DETAILED DESCRIPTION OF THE PREFERRED EMBODIMENTS

Figure 1:
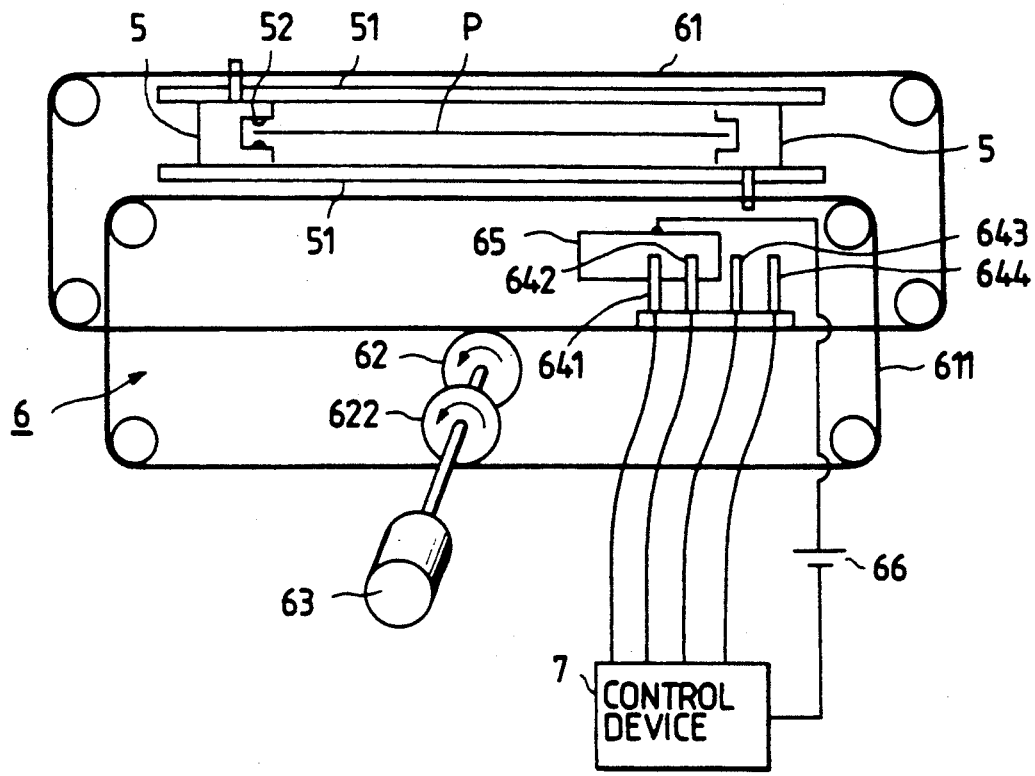
FIG. 1 is a front view of main portions of a first embodiment of a thermal printer according to the invention.

In the drawings, there is shown an embodiment of a thermal printer according to the invention.

Figure 3:
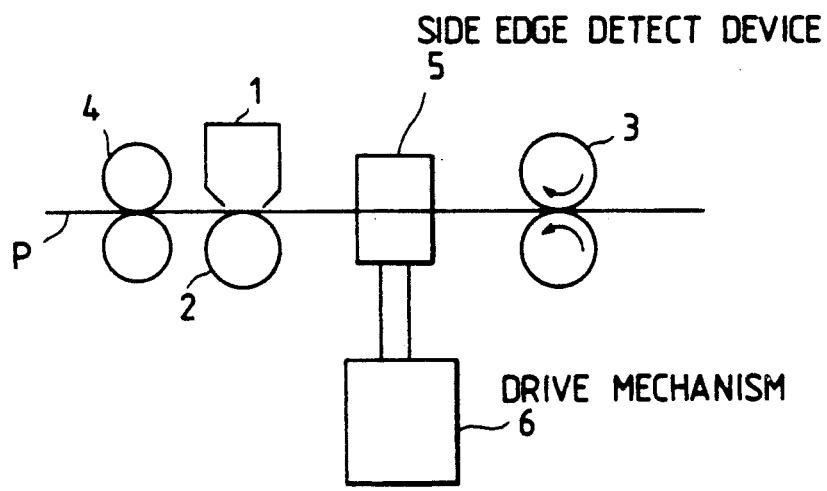

A printer capable of using various sizes of paper include; a first type of printer which supplies the paper while the printer is set to one side of the paper, and a second type of printer which supplies the paper while it is set centrally of the width of the printer. The present embodiment belongs to the second type of printer. In FIG. 3, reference numeral 1 designates a thermal line head, 2 stands for a platen roller, 3 refers to a paper supply roller, 4 represents a paper drawing roller, 5 designates a device for detecting the side edges of the paper (which is hereinafter referred to as paper side edge detection device), and 6 designates a drive mechanism which is used to drive the paper edge detection device 5, that is, it moves the paper side edge detection device 5 in a direction perpendicular to the surface of the paper in FIG. 3. P designates the paper.

In FIG. 1, there are shown the details of the paper side edge detection device 5 and drive mechanism 6. The side edge detection 5 includes right and left side edge detection units, 5a and 5b respectively. The two side edge detection units 5a and 5b are designed to slidably move along horizontal guides 51. Detection units 5a and 5b are formed in a forked shape on the mutually opposed portions of guides 51 thereof, respectively. Left side edge detection unit 5a includes a photoelectric object sensor 52. P designates paper which is fed in a direction perpendicular to the surface of the paper in this figure. The two side edge detection units are moved along the guides 51 in the mutually opposing directions in such a manner that they can hold the paper between them from, right and left, and the movements of the two side edge detection units are caused to stop where the sensor 52 in the forked portion thereof detects the side edge of the paper. In this manner, the supply paper is positioned and restricted in the center of the printer in the width direction thereof and a detection signal for the edge of the paper is generated.

The drive mechanism 6 for the paper side edge detect device 5, as shown in FIG. 1, comprises two wire loops 61 and 611 respectively connected to the right and left side edge detection units 5a and 5b, drive pulleys 62 and 622 around which the respective wire loops are partly wound, and a motor 63 which is used to rotate the pulleys. The right and left side edge detection units can be respectively moved by the wire loops 61 and 611 in a mutually symmetrical manner. There are mounted several slide contact pieces (brushes) 641, 642, ---, 64n to one wire loop 61, and there is also disposed a conductor plate 65 in such a manner that it can be in sliding contact with one or more of the brushes. The brushes 641, --- are respectively connected to a control device 7 and the conductor plate 65 is connected through a power source 66 to the control device 7. If a certain brush is brought into contact with the conductor plate 65, then the voltage of the power source 66 will appear in the brush. The control device 7 detects this voltage and thus is able to find the width of the paper supplied by detecting the number of the brushes in which the power source voltage appears.

Figure 2:
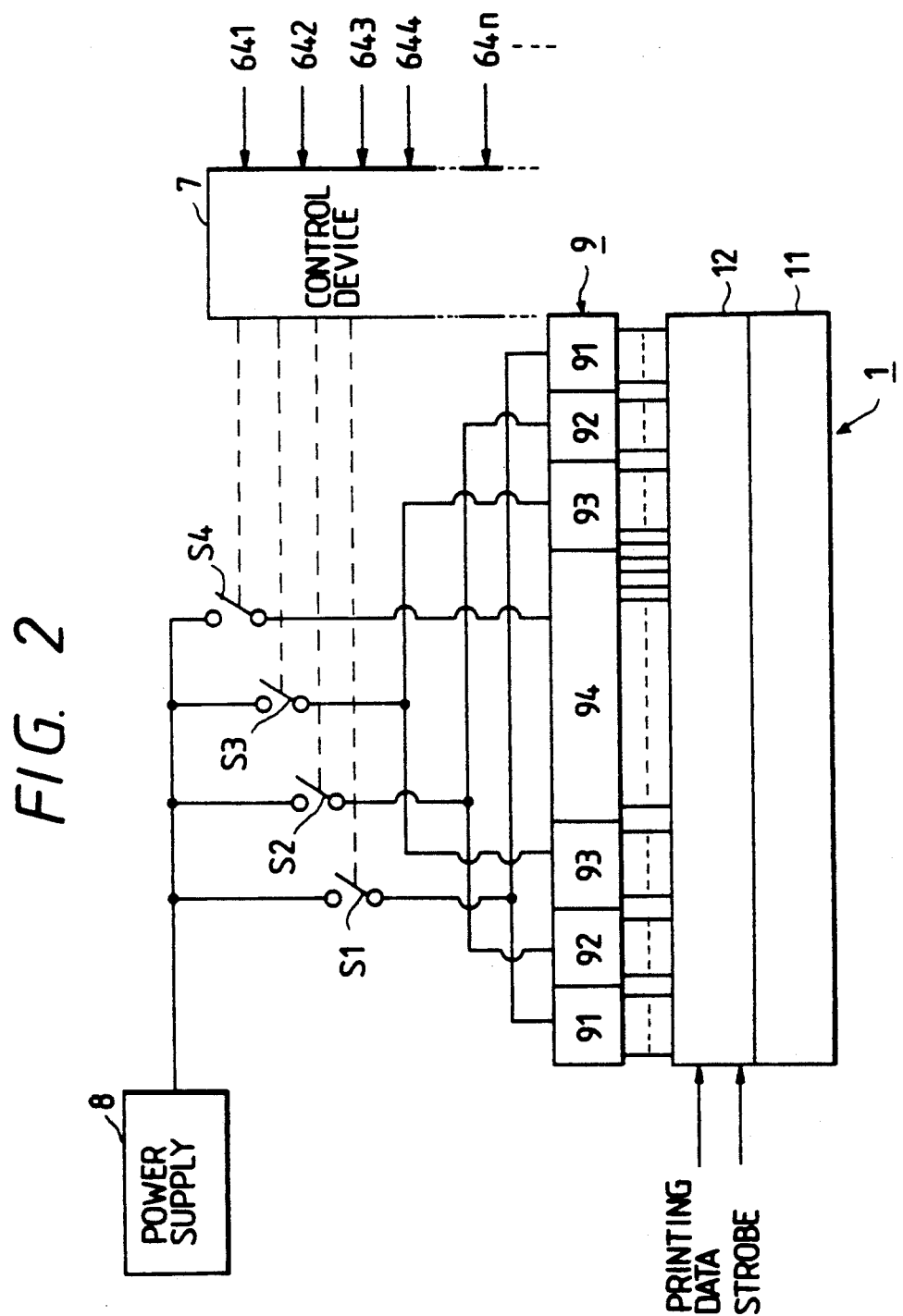
FIG. 2 is a block diagram of a control circuit employed in the above embodiment; and, FIG. 3 is a general side view of the above embodiment.

Referring now to FIG. 2, there is shown a control circuit of the thermal line head 1 to be operated by the control device 7. The thermal line head 1 includes a heat generating part 11 comprising a large number of heating elements arranged in a line, and a switch part 12 which is used to control electric supply or electric cutoff with respect to the respective heating elements. If dot data corresponding to a dot line of the printing contents is input into the switch part 12 and a strobe signal is applied, then electricity is supplied to the heating elements required from the power source 8. In this figure, 9 designates a distribution circuit which is used to distribute the current to be supplied from the power source to the respective heating elements. In FIG. 2, the distribution circuit 9 is divided into four blocks 91, 92, 93 and 94, and the central block 94 corresponds to the paper that has the narrowest width. The four blocks are connected to the power source 8 through switches S1 to S4, respectively. These switches can be controlled, that is, opened and closed by the control device 7.

The control device 7 detects the presence or absence of the voltage in the brushes 641 to 644 (n=4 in FIG. 1). When no voltage is found in any of the brushes, then the control device 7 opens all of the switches S1 to S4 to thereby inhibit printing. On the other hand, when the brush 641 is found to have a voltage (that is, the brush 641 is found on), then the control device 7 finds that the paper supplied has the largest width and thus closes all of the switches S1 to S4 to thereby allow electric supply to all of the heating elements. When the brush 642 is on, then only the switch S1 is opened, and when the brush 643 is on, then the switches S1 and S2 are opened. When the brush 644 is on, then the switches S1 to S3 are opened to thereby allow electric supply to only the heating elements that are connected to the central block 94 corresponding to the paper having the smallest width. If paper having a width smaller than the above-mentioned smallest width is supplied in error, then the paper side edge detection device 5 is moved further inwardly to cause the brush 641 to go beyond the end of the conductive plate 65, so that the brush 641 is turned off. When the brush 641 is off and the remaining brushes are on, then the control device 7 opens all of the switches S1 to S4 to thereby inhibit printing, similarly when all of the brushes are off.

While in the foregoing description the control device is described as an independent device, in fact, the control operation of the control device 7 is performed as part of the functions of a device which controls the whole printer. Also, although in the above-mentioned embodiment the paper is positioned in the center of the width of the printer, of course, the present invention can also apply to a printer of another type which sets the paper to one side thereof and, in this case, the paper side edge detection device 5 may be provided only on one side of the printer. Further, the object sensor to be mounted to the paper side edge detection is not limited to the photoelectric sensor, but it may be a mechanical switch.

According to the invention, since the paper side edge detection device is moved in the paper width direction to detect the width of the paper, the presence or absence of the paper can be detected and the paper can be positioned properly. Also, due to the fact that the invention can restrict the width of the line head that can be electrically energized in accordance with the width of the paper supplied, even when paper having a width smaller than a predetermined width is supplied in error, the invention can prevent idle heating of the heating element(s).

What is claimed is:

1. A thermal printer comprising:
    paper edge detecting means for moving in a width, or lateral, direction of a paper to detect side edges of said paper, said paper edge detecting means comprising two side edge detecting units each including a forked shape portion, at least one of said forked shape portions having a sensor which detects said side edges of said paper;
    distance detecting means for detecting a moving distance of said paper edge detecting means from a reference position thereof to an edge position of said paper side edge one said sensor has detected said side edge, and generating a corresponding signal; and
    control means for receiving said signal and correspondingly inhibiting power supply to portions of a thermal head disposed outside of said side edges of said paper, said signal being generated from said distance detecting means corresponding to said moving distance of said side edge detecting means.

2. A thermal printer as claimed in claim 1, further comprising;
    driving means for driving said paper edge detecting means in a width, or lateral, direction of said paper.

3. A thermal printer as claimed in claim 2, wherein said driving means comprises a pair of wire loops connected to said edge detecting units, respectively, and one of said wire loops has a lot of contact pieces contacting a conductor plate which is connected to said control means.

4. A thermal printer as claimed in claim 1, wherein said thermal head comprises a heat generating portion including a plurality of heat generating elements, a switch portion which controls current flowing to said heat generating elements, and a distribution circuit divided into several blocks connected to part of said heat generating elements.

5. A thermal printer as claimed in claim 4, wherein said distribution circuit is connected to said control means through several switches which are joined to said blocks, respectively.

* * * * *